United States Patent [19]

Hickin

[11] Patent Number: 4,643,229
[45] Date of Patent: Feb. 17, 1987

[54] SEWAGE DISPOSAL HOSE

[76] Inventor: Ray Hickin, 43-046 Old Orchard Rd., Sardis, British Columbia, Canada, V2R 1A9

[21] Appl. No.: 744,054

[22] Filed: Jun. 12, 1985

[51] Int. Cl.$^4$ .......................... F16L 3/00; B60R 15/04
[52] U.S. Cl. .................... 138/109; 138/110; 138/118; 138/121; 138/178; 4/323
[58] Field of Search ............ 138/96 R, 96 T, 109, 138/110, 121, 118, 178; 4/321, 323; 137/344, 355.16

[56] References Cited

U.S. PATENT DOCUMENTS

| 1,211,067 | 1/1917 | Braly | 138/109 X |
| 2,852,216 | 9/1958 | Peters | 138/121 X |
| 2,942,625 | 6/1960 | Costanzo | 138/96 R |
| 3,143,146 | 8/1964 | Kennedy | 138/121 X |
| 3,760,430 | 9/1973 | Brenden | 4/323 X |
| 3,773,087 | 11/1973 | Katayama | 138/121 X |
| 3,998,065 | 12/1976 | Darnell | 138/121 X |
| 4,133,347 | 1/1979 | Mercer | 4/323 |
| 4,180,102 | 12/1979 | Larkin | 138/110 X |
| 4,223,702 | 9/1980 | Cook | 4/323 X |
| 4,452,563 | 6/1984 | Belanger et al. | 138/110 X |

FOREIGN PATENT DOCUMENTS 1163815  9/1969  United Kingdom ............... 138/118

Primary Examiner—James E. Bryant, III
Attorney, Agent, or Firm—I. Louis Wolk

[57] ABSTRACT

Flexible and expansible hose for use with recreational vehicles for waste disposal and the like is provided with an easily applied and removable protective sleeve which is coextensive therewith.

2 Claims, 5 Drawing Figures

SEWAGE DISPOSAL HOSE

BACKGROUND OF THE INVENTION

The present invention relates to flexible hose and especially to the type of flexible sewer hose utilized for discharge of waste and sewage effluent from holding tanks in recreational vehicles otherwise known as "RV's."

These RV's, as they are known, are in widespread use and include several different types such as motor homes, campers, and various types of trailers, These usually incorporate many conveniences including running water, showers, toilet facilities, cooking facilities. The waste or discharge from these facilities is generally received and retained in a self contained holding tank in the vehicle when it is not in a camp where the holding tank can be directly connected to a sewer or dump tank.

When the vehicle is parked in a camp or park, it is customary to connect the vehicle holding tank directly to a sewer or dump tank and transfer accumulated waste as it is produced by means of flexible sewer or discharge hose having a quick connect coupling at one end which can be secured to a waste connection on the vehicle. Such hose is generally flexible and stretchable and may be 4-6 feet long when relaxed and stretchable to 10-12 feet.

The hose construction most commonly utilized is in the form of a pleated plastic tube such as a vinyl polymer or the like reinforced by means of a wire spring imbedded or attached to the pleats thereof which permits the hose to be stretched for discharge or collapsed for storage. The most commonly used type of hose for this purpose consists merely of a light weight plastic sleeve reinforced with a light spring having a low degree of resilience and in use the hose frequently rests at least partially on the ground when it is inserted into the sewage dump and connected to the R.V. sewage disposal outlet.

A serious problem often arises with the use of such hose due to the fact that wear and tear after a period of use frequently causes small holes to form with resultant leakage of sewage. This is generally due to abrasion, usually at a point where the wire reinforcement is bonded to the plastic sleeve but may also be due to punctures from other sources. To remedy this problem by using heavy weight plastic sleeves would greatly increase the cost of such hose as well as greatly increasing weight and bulk.

SUMMARY OF THE INVENTION

In accordance with the present invention, it has been discovered that application of a separate protective sleeve over the conventional sewage disposal hose of the type described, of appropriate structure and composition, can greatly increase the life of such sewage hose at a low cost. Such sleeve is formed of light, flexible and durable material such as a plastic coated or impregnated fabric which can be applied as a sleeve or covering over any conventional type of hose in a close fitting manner and is of such length and diameter that it can conform to the sewage hose both in its collapsed and stretched configuration as shown in the description and drawings described below.

This will permit the utilization of a relatively inexpensive protective covering for the sewer hose which can be easily replaced as necessary.

In addition, the invention provides for the insertion of rigid tubular members into the ends of the assembly in order to permit firm clamping of the ends and removal of such inserts and clamps for further use with replacement sleeves.

DETAILED DESCRIPTION

Figure 1:
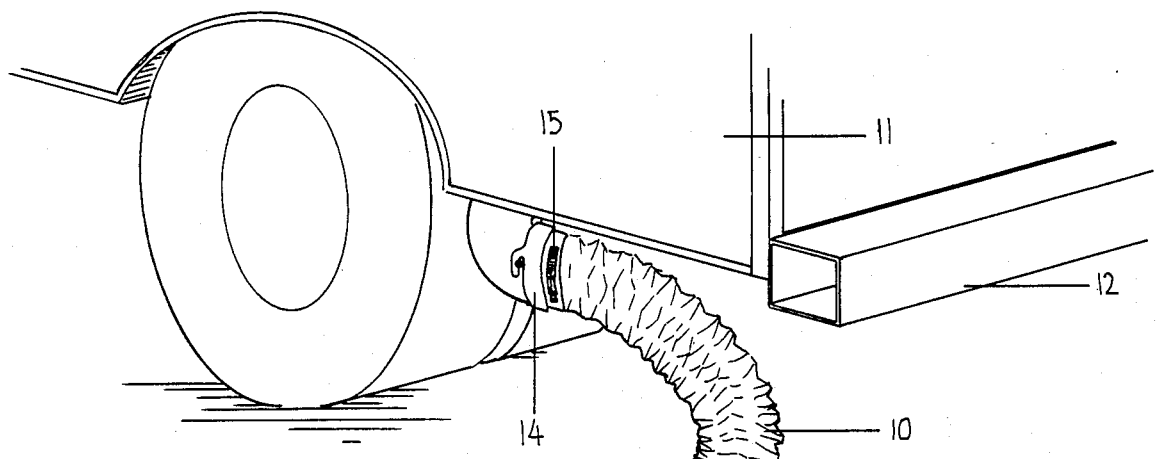
FIG. 1 is a view in elevation showing the assembled hose with protective sleeve connected to an RV and a sewage dump.

As shown in FIG. 1 of the drawings, the hose assembly 10 of the invention is shown connected to an RV 11, having a hose storage bumper 12, and to its sewage disposal outlet by means of a quick disconnect fitting 14 at the RV the sewage dump 13 through a connector tube inserted in the hose. This tube or insert is rigid and formed of a suitable plastic material which may be a type of rigid polyvinyl chloride. 15 and 15a show clamps which attach the protective cover of 10 to the ends of the internal hose as described further below.

Figure 2:
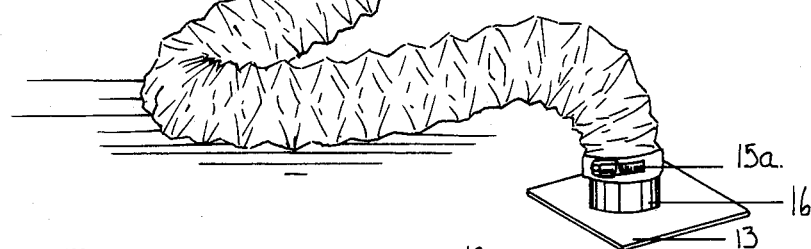
FIG. 2 is a view in elevation of a segment of conventional corrugated sewage hose with elements of the application of the present invention shown.

In FIG. 2 the conventional type of sewage disposal hose is shown at 17. This hose generally consists of a tube of lightweight plastic material, i.e., polyvinyl chloride reinforced internally with a light wire spring and having an inside diameter of about 3" more or less. The construction is usually such that it can be compressed for storage with a length compressed of from 2-4 feet and extendible to about 10-12 feet in use.

As shown also in FIG. 2, a sleeve 16 may be clamped in the end which is to be inserted in the sewage dump and this is then clamped to the inner hose by means of a clamp 15 or 15a such as a stainless steel worm clamp which is inserted into a circumferential pocket formed in both ends of the protective outer sleeve 10a by folding over the ends thereof as shown at 18 and stitching as shown at 19 as explained further below.

Figure 3:
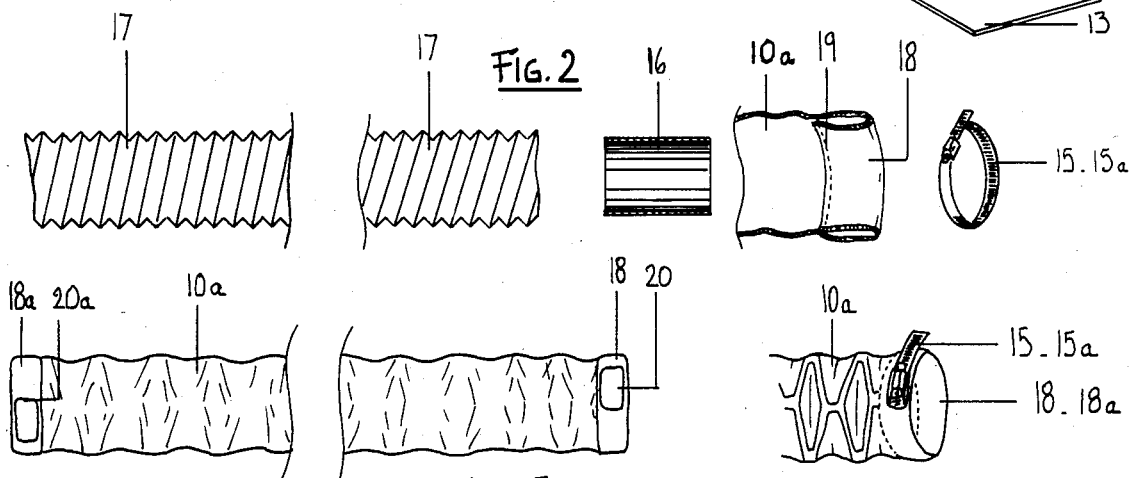
FIG. 3 is a view in elevation of a sleeve ready to be applied to a sewage hose according to the invention.
Figure 4:
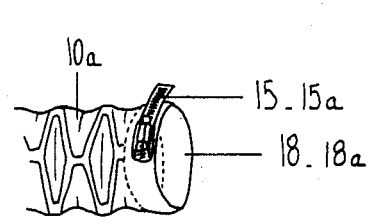
FIG. 4 is a view in elevation showing one end of a sleeve prior to assembly over a conventional hose.

As shown in FIG. 3, a protective sleeve 10a is formed of a light, flexible and durable material such as a vinyl or other plastic coated and/or impregnated fabric which may be sewed longitudinally to provide a tubular sleeve having a diameter such that it fits easily but snugly over the inner sewage disposal hose and having sufficient length to conform to the inner hose when it is fully extended. In order to attach this sleeve to the inner hose by means of clamps, the ends are provided with circumferential pockets 18 and 18a formed by folding the end edges over sufficiently and stitching (see FIG. 2) and forming openings 20 and 20a in each end to permit insertion of clamps as shown for example in FIG. 4, where clamps 15a and/or 15 are inserted in pockets 18 and 18 formed at each end of the sleeve.

Figure 5:
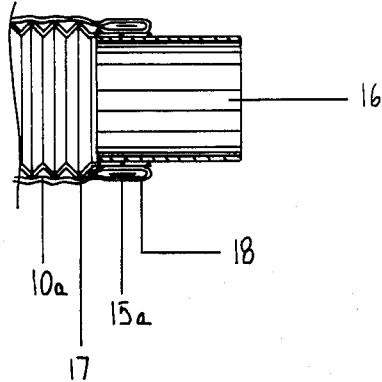
FIG. 5 is a cross-sectional view showing the sleeve of the invention assembled over a hose.

As shown in FIG. 5 a rigid tubular inserted is placed within one end of the sewage disposal hose 17 either before or after the outer protective sleeve 10 is placed thereover so that both sleeve and hose may be clamped at that end by means of clamp 15a inserted circumferentially through pocket 18. This provides an extension which can be conveniently inserted into the sewage dump opening as shown in FIG. 1.

Similarly, a short rigid tube 21 is inserted into the other end to permit clamping of the ends of the sleeve and hose thereto by means of clamp 15 inserted through pocket 18a. This also permits the quick disconnect fitting 14 to be slidably and removably inserted into the end of the assembly. By the use of the rigid tubular inserts the inner hose or liner and the outer protective sleeve can be firmly clamped at the ends. In addition, if either the inner hose or liner, or the outer sleeve become worn and must be replaced, the end inserts and clamps may be removed and used again with a replacement sleeve.

It will be obvious to those skilled in the art to make various changes or modifications in the application of the invention described herein such as selection of materials utilized or means for attaching the protective tube to the sewer hose, or in utilizing the protective tubing for other types of hose where leakage and abrasion may occur.

I claim:

1. A flexible hose for discharging waste from holding tanks in recreational vehicles or the like, which comprises an inner flexible and stretchable tubular hose member and an outer flexible protective tubular sleeve surrounding said inner hose member in a close fitting manner and having such length and diameter as to conform to the inner hose member in both its collapsed and stretched configuration, a rigid tubular insert positioned within each end of the inner hose member and surrounded thereby and by the ends of the protective sleeve surrounding said inner hose member, said outer protective sleeve having circumferential pockets formed at each end by folding over and securing ends of said sleeve, and a clamp positioned within each fold in clamping engagement with the ends of the outer sleeve, the inner hose and the rigid tubular inserts at the ends thereof.

2. A flexible hose according to claim 1 wherein one of said rigid inserts at one end is in slidably engagement with a disconnect fitting for attachment to a holding tank discharge outlet and the other of said rigid inserts at the other end extends beyond said end for insertion into a sewage dump.

* * * * *